United States Patent [19]

Rosengren et al.

[11] Patent Number: 5,588,047
[45] Date of Patent: Dec. 24, 1996

[54] INTERFACE FOR SIMULATING A TELEPHONE LINE CONNECTION BETWEEN TWO DEVICES FOR ESTABLISHING A COMMUNICATION PATH BETWEEN THE DEVICES

[75] Inventors: Lars Rosengren, Huskvarna; Ingemar Emricsson, Jönköping, both of Sweden

[73] Assignee: Rosengren Teknik AB, Huskvarna, Sweden

[21] Appl. No.: 12,526

[22] Filed: Feb. 2, 1993

[51] Int. Cl.[6] ................................................ H04M 11/00
[52] U.S. Cl. ............................................. 379/100; 379/93
[58] Field of Search ...................... 379/100, 93, 94, 379/96, 97, 98, 27, 28, 167–176, 111; 358/400, 468, 434

[56] References Cited

U.S. PATENT DOCUMENTS 4,652,933  3/1987  Koshiishi ........................ 358/434
4,964,154 10/1990  Shimotono ...................... 379/100
4,991,200  2/1991  Lin .................................. 379/100
5,224,155  6/1993  Satomi et al. .................. 379/100
5,233,642  8/1993  Renton ............................ 379/111

*Primary Examiner*—Jason Chan
*Attorney, Agent, or Firm*—Cohen, Pontani, Lieberman, Pavane

[57] ABSTRACT

A device for simulating a telephone line connection between a sending unit and a receiving unit, each said unit two devices, each device having a telephone line connector. The inventive device generates a tone signal corresponding to a telephone calling tone when the sending unit outputs a signal indicating a desire to transmit data. The tone signal lasts for a predetermined amount of time sufficient to inform the sending unit that it may begin transmission of the data. A direct communication path is automatically established between the sending and receiving units connected to the device. The sending and receiving units are continuously provided with a line voltage simulating a conventional telephone line voltage, thus maintaining the communication path in an active state during the transmission.

10 Claims, 1 Drawing Sheet

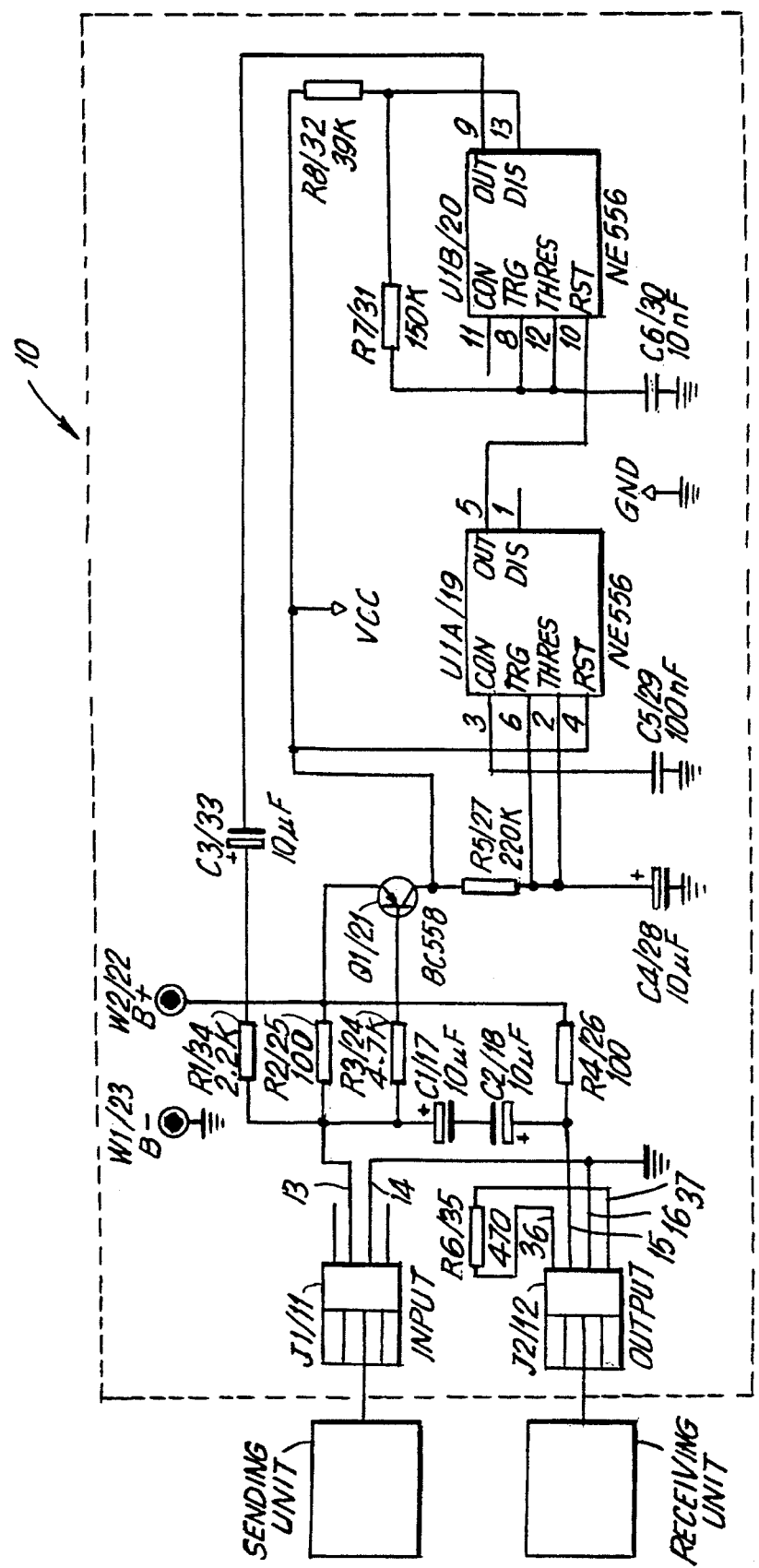

INTERFACE FOR SIMULATING A TELEPHONE LINE CONNECTION BETWEEN TWO DEVICES FOR ESTABLISHING A COMMUNICATION PATH BETWEEN THE DEVICES

BACKGROUND OF THE INVENTION

1. Field of the Invention

The present invention relates to means for the interconnection of two devices provided with telephone line connections, preferably a personal computer and a telefax machine.

2. Description of the Prior Art

Personal computers, PC's, especially portable types, are more and more commonly being equipped with telefax modems allowing them to send and receive printouts as telefax documents via the common telephone system. In reality this is a type of remote print-out or remote scanning of documents as an alternative to the ordinarily connected printer or picture scanner. Often, and especially when using a portable computer outside the ordinary work place, a suitable printer is not available, or the possibly available printer is not properly interfaced or there is no suitable software driver for the possibly available printer. In such cases it appears reasonably obvious to utilize the nowadays commonly available telefax machines for the purpose of printout or scanning, especially as a temporary solution away from the office. This can always be done, provided that the computer is equipped with a fax modem, by using the fax function as intended, i e by calling up the intended fax machine via its telephone connection. This procedure however, requires the availability of two separate telephone lines close to one another. Furthermore, these lines are tied up for extended periods during the printout of long documents.

If one tries to interconnect the devices directly to one another by joining its telephone line connectors, one will find that the devices will not work as intended because they are internally provided with sensing devices to make sure they are connected to properly functioning telephone lines by the detection of the calling tone and line voltage. Previously a device is as described in U.S. Pat. No. 4,991,200, was used to simulate the ring signal function and thereby to order the fax machine via a relay signal routing system to start receiving whatever information the computer transmits.

SUMMARY OF THE INVENTION

The present invention greatly simplifies the procedure by recognizing the capability of modern fax machines and modems to be started by a manual intervention, without the reception of a ring signal, known as "start" or "manual reception" or "manual". However this is not sufficient. Calling tones and line voltage still need to be present for the devices to accept interconnection properly. Furthermore the calling tone should only be present during a predetermined time, to simulate the normal operation of the central office, and its timing should be automatically achieved to minimize the need for manual intervention other than to press "start". It is the object of the present invention to provide the needed calling tone during the required timing period and also to provide a line voltage in an extremely simple and small battery powered unit especially well suited for portable use.

By the insertion of the device according to the present invention in the line between the two communicating devices, both devices are made to "believe" that they are connected via normally functioning telephone lines, and thus transmission and printout or scanning of documents will take place locally without the need for any external connections.

A further advantage of the present invention is that the communication loop is made very short and thus free from interference and other detriments, making it suitable for the highest communication speed without loss of quality, making it feasible to always use the highest available resolution without too much time penalty. The printout quality approaches that of presently common laser printers.

Eliminating the need for a dedicated printer and or scanner, is especially advantageous in portable applications since such devices are heavy and cumbersome to carry and consume considerable battery power. Fax machines are very commonly available and can be made to serve as high quality printers and scanners by the application of the present invention. This application also saves a considerable amount of money otherwise needed to acquire additional equipment.

In addition to its primary use to interconnecting a computer with a telefax machine, other uses for the device according to the invention can be foreseen wherever equipment connected to telephone systems is involved.

An obvious application is testing and servicing of such equipment such as alarm systems, remote control systems, telecommunications systems, telephone answering devices etc. where usually only one incoming line is available at the location of the system, making it difficult for the technician to gain access to the system.

The device according to the invention is described as a separate portable unit for the sake of clarity, but an obvious alternative would be for the device to be incorporated as a system component into preferably fax modem units for portable computers.

BRIEF DESCRIPTION OF THE DRAWING

The FIGURE is a circuit diagram of an interconnecting device constructed in accordance with the present invention.

DETAILED DESCRIPTION OF THE PREFERRED EMBODIMENT

The device according to the invention has three main parts:

a) line voltage source b) timer c) calling tone generator

The line voltage source (a) provides line voltage both to transmitting and receiving units, corresponding to the line voltage present in common telephone lines. The timer (b), 19, activates the calling tone generator during a predetermined time. The frequency and strength of the calling tone simulates that of a normal telephone line.

A Line voltage source

In the figure, the transmitting unit (i e the computer or the fax) is connected to the device according to the invention 10 by a connector, 11. The receiving unit (i e the fax or the computer) is correspondingly connected to another connector, 12.

The telephone line connection of the transmitting unit is via the terminals 13 and 14 in the connector 11. The corresponding connection of the receiving unit are the terminals 15 and 16 in the connector 12.

Terminals 14 and 16 are attached together and connected to common ground reference. Terminals 13 and 15 communicate via a capacitance, in the example, provided by two back to back connected electrolytic capacitors, 17, 18.

Terminal 13 of the connector for the transmitting unit is connected by a resistor to the positive terminal 22 of a voltage source. Terminal 15 of the connector for receiving unit is similarly connected via a resistor 26 to the positive terminal 22 of the same voltage source. The voltage source, also arranged to supply working voltage for the simulator, has its negative terminal connected to reference ground. The telephone line connection of the receiving unit includes terminals 36 and 37. A resistor 35 is connected between terminals 36 and 37 to simulate, by its comparatively low resistance, a telephone with its receiver off hook.

B Timer

A PNP transistor 21 has its emitter connected to the positive terminal 22 of the voltage source. Its base is connected via a resistor 24 to the telephone connection of the transmitting unit. (terminal 13). The collector is connected to the positive reference of timing circuits 19 and 20. The transistor 21 acts as a switch to supply operating current to the timing circuits 19 and 20. The transistor switch also supplies the capacitor 28 with a charging current via a timing resistor 27.

The timers 19 and 20 have three input terminals, conventionally labelled TRG, THRES AND RES, and one output terminal labelled OUT. The object of capacitor 29 connected from terminal CON to ground is to stabilise the circuit. Terminal RST is deactivated by its connection to VCC. Terminals TRG and THRESH are connected to the positive terminal of timer capacitor 28. The timer 19 controls timer (oscillator) 20 via terminal OUT.

C Calling tone generator

The timer circuit 20 is connected to operate as an oscillator and is controlled by the timer 19 by having its RST terminal being connected to the OUT terminal of timer 19.

The trig terminal TRG of the timer 20 is connected to terminal THRES of timer 20 and to one terminal of capacitor 30. The same capacitor terminal is connected to the output DIS of timer 20 via resistor 31 and further to the positive reference VCC via an additional resistor 32. The opposite terminal of the capacitor 30 is connected to ground. The output (OUT) of the circuit is connected via capacitor 33 and resistor 34 to terminal 13 of connector 11. The value of the components 30,31,32,33 and 34 determine frequency and amplitude of the resulting calling tone voltage.

In the preferred example the timers have been of commonly available type NE556 and other components according to list:

| Transistor | BC558 Ref no | value |
|---|---|---|
| Resistors | 24 | 4k7 Ω |
| | 25 | 100 Ω |
| | 26 | 100 Ω |
| | 27 | 220 kΩ |
| | 31 | 150 kΩ |
| | 32 | 39 kΩ |
| | 34 | 2k2 Ω |
| Capacitors | 17,18 | 10 μF |

The telephone line simulator according to the described examples functions in the following manner.

The resistance between the terminals 13 and 14 of connector 11 is normally high. The resistance changes to a low value when a transmission is imminent. Current starts to flow into the base of transistor 21 via its resistor 24 and the transistor starts to conduct. The collector current through resistor 27 begins to charge capacitor 28. When terminal RST of timer 19 is high and at the same time terminal TRG of timer 19 is low, the timer 19 is initiated and outputs a high signal at the input terminal RST of timer 20. This timer starts to operate and generates a signal corresponding to the calling tone of a normal telephone line. This calling tone is conducted to terminal 13 of the connector 11 so that the transmitting device, i e the PC, receives confirmation that it can begin its transmission procedure, possibly by sending a telephone number, what specific number it sends is irrelevant since the line is directly connected. Manual reception is now activated from the receiving device, i e the fax machine, and the resistance between terminals 15 and 16 are thus changed from a high to a low value. The connection is now established and communication may start.

The activation time for timer 19 is determined by the charging time of capacitor 28 via its resistor 27 and thus by the value of these components. When the capacitor is charged, the timer 19 switches it output to a low value thus stopping the calling tone generation by timer 20. This procedure simulates the disappearance of the calling tone after dialling on normal telephone lines. The established connection remains active and line current is supplied from the voltage source via resistors 25 and 26.

At disconnection, the resistance between terminals 13 and 14 changes to a high value with the consequence that transistor 21 ceases to conduct thus stopping supply to timers 19, 20. At the same time capacitor 28 is discharged by timer 19 in preparation for a new connect procedure.

The described example shows the additional advantage that the simulator does not consume any power when the lines are disconnected thus eliminating the need for a separate switch.

The invention is not limited to the described example or to what is shown in the drawings. Other versions and modifications are possible within the scope of the invention. Thus it is possible to integrate the same functions into any of the discussed devices such as the modem of the computer, thereby eliminating the need for a separate unit with its cables etc. The unit can be supplemented by a ring signal detector if fully automatic operation is desired.

I claim:

1. A circuit connected between a transmitting device and a receiving device, which are disposed in close proximity to each other, for simulating a telephone ring signal provided to the transmitting device to facilitate the transmission of data from the transmitting device to the receiving device, said circuit comprising:

an input terminal for connection to the transmitting device;

sensing means connected to said input terminal for sensing when transmission of data from the transmitting device is imminent;

an output terminal for connection to the receiving device, said output terminal being connected to said input terminal for providing a transmission path for data from said input terminal;

a voltage terminal connected to said input and output terminals for providing a transmission voltage to the transmitting and receiving devices during the transmission of data;

a telephone ring generator circuit connected to said sensing means for generating, for a preset time duration, a signal representative of a telephone ring when imminent transmission of data is sensed by said sensing means, said signal being provided to said input terminal during said preset time duration;

a timing circuit powered by said voltage terminal and connected to said ring generator circuit for instructing said ring generator circuit when to cease generating said representative ring signal; and switching means connected between said voltage terminal and said timing circuit for providing voltage from said voltage terminal to said timing circuit when said sensing means senses that transmission of data from the transmitting device is imminent.

2. The circuit of claim 1, wherein said switching means comprises a transistor.

3. The circuit of claim 2, further comprising a capacitance connected between said input terminal and said output terminal.

4. The circuit of claim 1, wherein said timing circuit comprises a resistor and a capacitor, said preset time duration being controlled by values of said resistor and capacitor.

5. The circuit of claim 4, further comprising a capacitance connected between said input terminal and said output terminal.

6. The circuit of claim 5, wherein said capacitance comprises first and second electrolytic capacitors each having a positive and negative terminal and coupled together at said negative terminals.

7. The circuit of claim 1, further comprising a capacitance connected between said input terminal and said output terminal.

8. The circuit of claim 7, wherein said capacitance comprises first and second electrolytic capacitors each having a positive and negative terminal and coupled together at said negative terminals.

9. The circuit of claim 1, wherein said circuit comprises an integral part of the transmitting device.

10. The circuit of claim 1, wherein said circuit comprises an integral part of the receiving device.

* * * * *